(12) United States Patent
Luvö

(10) Patent No.: US 12,242,574 B2
(45) Date of Patent: Mar. 4, 2025

(54) ADS FEATURE VERIFICATION

(71) Applicant: Zenseact AB, Gothenburg (SE)

(72) Inventor: Thomas Luvö, Stenkullen (SE)

(73) Assignee: Zenseact AB, Gothenburg (SE)

( * ) Notice: Subject to any disclaimer, the term of this patent is extended or adjusted under 35 U.S.C. 154(b) by 259 days.

(21) Appl. No.: 17/940,190

(22) Filed: Sep. 8, 2022

(65) Prior Publication Data

US 2023/0094220 A1 Mar. 30, 2023

(30) Foreign Application Priority Data

Sep. 13, 2021 (EP) .................................. 21196364

(51) Int. Cl.
| | |
|---|---|
| *G06F 21/10* | (2013.01) |
| *G05D 1/00* | (2024.01) |
| *G05D 1/228* | (2024.01) |
| *G05D 1/698* | (2024.01) |
| *G06F 21/64* | (2013.01) |

(52) U.S. Cl.
CPC ....... *G06F 21/1085* (2023.08); *G05D 1/0088* (2013.01); *G05D 1/0214* (2013.01); *G05D 1/228* (2024.01); *G05D 1/698* (2024.01); *G06F 21/64* (2013.01)

(58) Field of Classification Search
CPC ... G06F 21/1085; G06F 21/64; G05D 1/0088; G05D 1/0214; G05D 1/228; G05D 1/698
See application file for complete search history.

(56) References Cited

U.S. PATENT DOCUMENTS

| | | | | |
|---|---|---|---|---|
| 9,946,531 | B1* | 4/2018 | Fields | G05D 1/0278 |
| 11,107,300 | B2* | 8/2021 | Unagami | G07C 5/008 |
| 11,861,951 | B2* | 1/2024 | Unagami | G07C 5/008 |
| 2018/0339712 | A1* | 11/2018 | Kislovskiy | B60W 50/0205 |
| 2019/0025818 | A1* | 1/2019 | Mattingly | H04W 4/46 |
| 2019/0043050 | A1* | 2/2019 | Smith | G06Q 20/401 |

(Continued)

FOREIGN PATENT DOCUMENTS

EP     3809226 A1     4/2021

OTHER PUBLICATIONS

EPO Communication with European Search Report dated Mar. 14, 2022 for Patent Application No. 21196364.0 filed Sep. 13, 2021, consisting of 7-pages.

*Primary Examiner* — Dale W Hilgendorf
(74) *Attorney, Agent, or Firm* — Weisberg I.P. Law, P.A.

(57) ABSTRACT

A distributed verification system for supporting verification of ADS features within specific ODDs. The distributed verification system identifies at one or more ADS-equipped vehicles, a respective at least first verification instruction pertinent an at least first specified ODD of a specified ADS feature; collects at at least a first vehicle, verification data from execution by the at least first vehicle of the at least first ADS verification instruction while the specified ADS feature is active; generates at the at least first vehicle, a verification result transaction to be added to a distributed ledger of a block chain network, which verification result transaction includes verification information derived from the verification data along with information of circumstances and/or configuration of the at least first vehicle; and when consensus of the verification result transaction is reached on the network, adds the verification result transaction to the distributed ledger.

20 Claims, 4 Drawing Sheets

(56) References Cited

U.S. PATENT DOCUMENTS

| | | | |
|---|---|---|---|
| 2019/0066402 A1* | 2/2019 | Unagami | G07C 5/008 |
| 2019/0220011 A1* | 7/2019 | Della Penna | G07C 5/0841 |
| 2020/0026289 A1* | 1/2020 | Alvarez | G06F 16/27 |
| 2021/0046923 A1* | 2/2021 | Olson | B60W 30/095 |
| 2021/0107499 A1* | 4/2021 | Brännström | B60W 50/082 |
| 2022/0050463 A1* | 2/2022 | Zaydel | B60W 60/00186 |
| 2022/0342804 A1* | 10/2022 | Gyllenhammar | G06F 11/3688 |

* cited by examiner

ADS FEATURE VERIFICATION

CROSS REFERENCE TO RELATED APPLICATION

This Application is related to and claims priority to European Patent Application No. 21196364.0, filed Sep. 13, 2021, entitled ADS FEATURE VERIFICATION the entirety of which is incorporated herein by reference.

TECHNICAL FIELD

The present disclosure relates to supporting verification of ADS features within specific ODDs.

BACKGROUND

Within the automotive field, there has for quite some years been activity in development of autonomous vehicles. An increasing number of modern vehicles have advanced driver-assistance systems, ADAS, to increase vehicle safety and more generally road safety. ADAS—which for instance may be represented by adaptive cruise control, ACC, collision avoidance system, forward collision warning, etc.—are electronic systems that may aid a vehicle driver while driving. Moreover, in a not-too-distant future, Autonomous Driving, AD, will to greater extent find its way into modern vehicles. AD along with ADAS will herein be referred to under the common term Automated Driving System, ADS, corresponding to all different levels of automation, for instance as defined by the SAE J3016 levels (0-5) of driving automation. An ADS may be construed as a complex combination of various components that can be defined as systems where perception, decision making, and operation of the vehicle—at least in part—are performed by electronics and machinery instead of a human driver. This may include handling of the vehicle, destination, as well as awareness of surroundings. While the automated system has control over the vehicle, it allows the human operator to leave all or at least some responsibilities to the system. To perceive its surroundings, an ADS commonly combines a variety of sensors, such as e.g. radar, LIDAR, sonar, camera, navigation and/or positioning system e.g. GNSS such as GPS, odometer and/or inertial measurement units, upon which advanced control systems may interpret sensory information to identify appropriate navigation paths, as well as obstacles and/or relevant signage.

Assuring the safety of an ADS is one of the central challenges in being able to release such a system to the market. It is of great importance that an ADS neither exposes its vehicle occupant(s) nor surrounding traffic participants to unacceptable risks. The process of verifying an ADAS product is commonly complex and costly, both in regards of effort and retest, but also in regards of full documentation and traceability of the results of time. Comparably, verification of AD is expected to on a large extent rely on the customer fleet and probed data. Thousands of vehicles will presumably collect data and evaluate the AD product in the field, providing feedback to a centralized verification machine and/or entity collecting the information for the purpose of verifying the complete AD product. Unique events are expected to be collected in this process and be sent to the central verification machine and/or entity for further improvements of the AD product. The input may improve the AD product, which subsequently may be distributed back to the fleet to continue the verification process of the improved product. When the verification process has reached its threshold, signals may be sent to the vehicles to activate the AD feature within the verified operational design domain, ODD. This verification process may be expected to continue through the AD product's lifetime to manage and expand the AD feature's ODD. Furthermore, for liability reasons, it is necessary to prove reliability and traceability of proof for this continued process and its verification results over the complete AD product life cycle.

Assuming that the complexity and cost of the process will increase from ADAS to AD and considering that the verification may depend on thousands or even millions of vehicles over many years compared to relatively few vehicles over a less extensive period of time, the complexity and cost can be expected to significantly increase.

SUMMARY OF THE INVENTION

It is therefore an object of embodiments herein to provide an approach supporting verification in an improved and/or alternative manner of ADS features within specific ODDs.

The object above may be achieved by the subject-matter disclosed herein. Embodiments are set forth in the appended claims, in the following description and in the drawings.

The disclosed subject-matter relates to a method performed by a distributed verification system for supporting verification of ADS features within specific ODDs. The distributed verification system identifies at one or more ADS-equipped vehicles connected via a peer-to-peer blockchain network, a respective at least first verification instruction pertinent an at least first specified ODD of a specified ADS feature. The distributed verification system further collects at at least a first vehicle of the one or more vehicles, verification data from execution by the at least first vehicle of the at least first ADS verification instruction while the specified ADS feature is active within and/or in association with the at least first specified ODD. Moreover, the distributed verification system generates at the at least first vehicle, a verification result transaction to be added to a distributed ledger of the network, which verification result transaction comprises verification information derived from the verification data along with information of circumstances and/or configuration of the at least first vehicle associated with the verification data. Furthermore, the distributed verification system adds, when consensus of the verification result transaction is reached on the network, the verification result transaction to the distributed ledger.

The disclosed subject-matter further relates to a distributed verification system adapted for supporting verification of ADS features within specific ODDs. The distributed verification system comprises a vehicle instruction identifying unit for identifying at one or more ADS-equipped vehicles connected via a peer-to-peer blockchain network, a respective at least first verification instruction pertinent an at least first specified ODD of a specified ADS feature. The distributed verification system further comprises a vehicle data collecting unit for collecting at at least a first vehicle of the one or more vehicles, verification data from execution by the at least first vehicle of the at least first ADS verification instruction while the specified ADS feature is active within and/or in association with the at least first specified ODD. Moreover, the distributed verification system comprises a vehicle transaction generating unit for generating at the at least first vehicle, a verification result transaction to be added to a distributed ledger of the network, which verification result transaction comprises verification information derived from the verification data along with information of circumstances and/or configuration of the at least first vehicle associated with the verification data. Furthermore, the distributed verification system comprises a vehicle transaction adding unit for, when consensus of the verification result transaction is reached on the network, adding the verification result transaction to the distributed ledger.

Furthermore, the disclosed subject-matter relates to at least a first node—for instance a network-connected ADS-equipped vehicle and/or a network-connected simulation node—comprising a distributed verification system as described herein.

Moreover, the disclosed subject-matter relates to a computer program product comprising a computer program containing computer program code means arranged to cause a computer or a processor to execute the steps of a distributed verification system described herein, stored on a computer-readable medium or a carrier wave.

The disclosed subject-matter further relates to a non-volatile computer readable storage medium having stored thereon said computer program product.

Thereby, there is introduced an approach enabling an efficient verification process where complexity and/or transactions costs may be limited. That is, since there is identified at one or more ADS-equipped vehicles connected via a peer-to-peer blockchain network, a respective at least first verification instruction pertinent an at least first specified ODD of a specified ADS feature, one or many vehicles—such as e.g. a vehicle fleet comprising numerous vehicles—which vehicles respectively are provided with an ADS and further are configured to communicate via said network, are made aware of verification requested for an indicated ADS feature in view of one or more indicated ODDs. That is, said vehicles learn of respective verification instructions—for instance available in in-vehicle ADS-related software and/or obtained over the network—stipulating an ADS feature to be verified within specific ODD(s) and/or actions to be followed for contributing to said ADS feature being verified in said specific ODD(s). Furthermore, since there is collected at at least a first vehicle of the one or more vehicles, verification data from execution by the at least first vehicle of the at least first ADS verification instruction while the specified ADS feature is active within and/or in association with the at least first specified ODD, there is gathered by at least a first vehicle, data resulting from said at least first vehicle acting on the ADS verification instruction(s) during the specified ADS feature being active within—and/or during circumstance and/or conditions relevant for—the specified ODDs. Accordingly, numerous and/or even an entire fleet of vehicles may respectively collect—for instance during day-to-day travel—verification data upon conditions being met pertinent respective vehicle's ADS verification instruction(s), for instance with the specified ADS-feature being active in a supervised mode and/or being active in a shadow mode. Moreover, that is, since there is generated at the at least first vehicle, a verification result transaction to be added to a distributed ledger of the network, which verification result transaction comprises verification information derived from the verification data along with information of circumstances and/or configuration of the at least first vehicle associated with the verification data, the at least first vehicle produces a blockchain transaction candidate comprising a verification summary indicative of at least a subset of—and/or selected subset(s) of—said vehicle's previously collected verification data along with data revealing circumstances and/or configuration of said vehicle that applied in association with said verification data, such as temporal and/or geographical information—e.g. start time, end time, route description etc.—ODD information, vehicle configuration and/or identity, sensor information and/or software version, etc. Accordingly, numerous and/or even an entire fleet of vehicles may respectively generate—for instance every time a respective active period of the specified ADS features is ended—respective verification result transactions to be added to the distributed ledger, to thereby—since the network is a peer-to-peer blockchain network—be accessible by all—or essentially all—network-connected vehicles. Furthermore, since the verification result transaction is added to the distributed ledger when consensus of the verification result transaction is reached on the network, the verification result transaction is logged to the blockchain—for instance with support from one or more smart contracts—upon consensus being reached among the vehicles and potential further nodes on the network, for instance based on a proof-of-stake approach. Accordingly, numerous and/or even an entire fleet of vehicles may respectively contribute to gathering verification data, with respective summaries thereof subsequently being added to the distributed ledger. The blockchain may thus be populated with potentially vast amounts of entries relating to verification data pertinent the specified ODDs of the specified ADS feature, which—due to the network being a peer-to-peer blockchain network—is available to all—or essentially all—vehicles connected to the network, without involvement of a centralized verification machine and/or entity needed.

For that reason, an approach is provided for in an improved and/or alternative manner support verification of ADS features within specific ODDs.

In other words, with the introduced concept, verification documentation and storage of proof may be decentralized, subsequently enabling an efficient verification process where complexity and/or transactions costs may be limited. This may further result in decreased investment and maintenance of the backend that would otherwise need to be centrally handled and would need to aggregate the vehicle fleet's verification results over time—such as over several years—and over many vehicles, such as thousands or even millions thereof. That is, the commonly known process to distribute verification tasks to a vehicle fleet, but let the vehicles send back all information to a centralized verification machine and/or entity for aggregation, reporting, storage and evaluation, is complicated and costly. Considering that such a process needs to continually run over potentially several years with an increasing fleet, the transaction cost to aggregate the information at a single destination from an increasing number of sources and manage potential updates in that data flow, is expected to drive cost higher. Furthermore, the data sets assign many requirements on the infrastructure and complicated GDPR data handling to manage traceability to the verification source, i.e. the vehicle fleet vehicles. With the introduced concept, however, by distributing not only the verification but also the verification reporting as a blockchain—thus limiting complexity and/or transactions costs of the verification process—additionally the General Data Protection Regulation (GDPR) data handling issue is managed as the vehicles may be tokenized through their individual signature and/or hash. The traceability and reliability of the verification result transaction(s) is also secure—i.e. reliable and long-term retention of information is fulfilled—in that the information, due to that entries to the blockchain can be considered permanent, is made permanent and non-changeable.

The technical features and corresponding advantages of the above-mentioned method will be discussed in further detail in the following.

BRIEF DESCRIPTION OF THE DRAWINGS

The various aspects of the non-limiting embodiments, including particular features and advantages, will be readily understood from the following detailed description and the accompanying drawings, in which.

DETAILED DESCRIPTION

Figure 1:
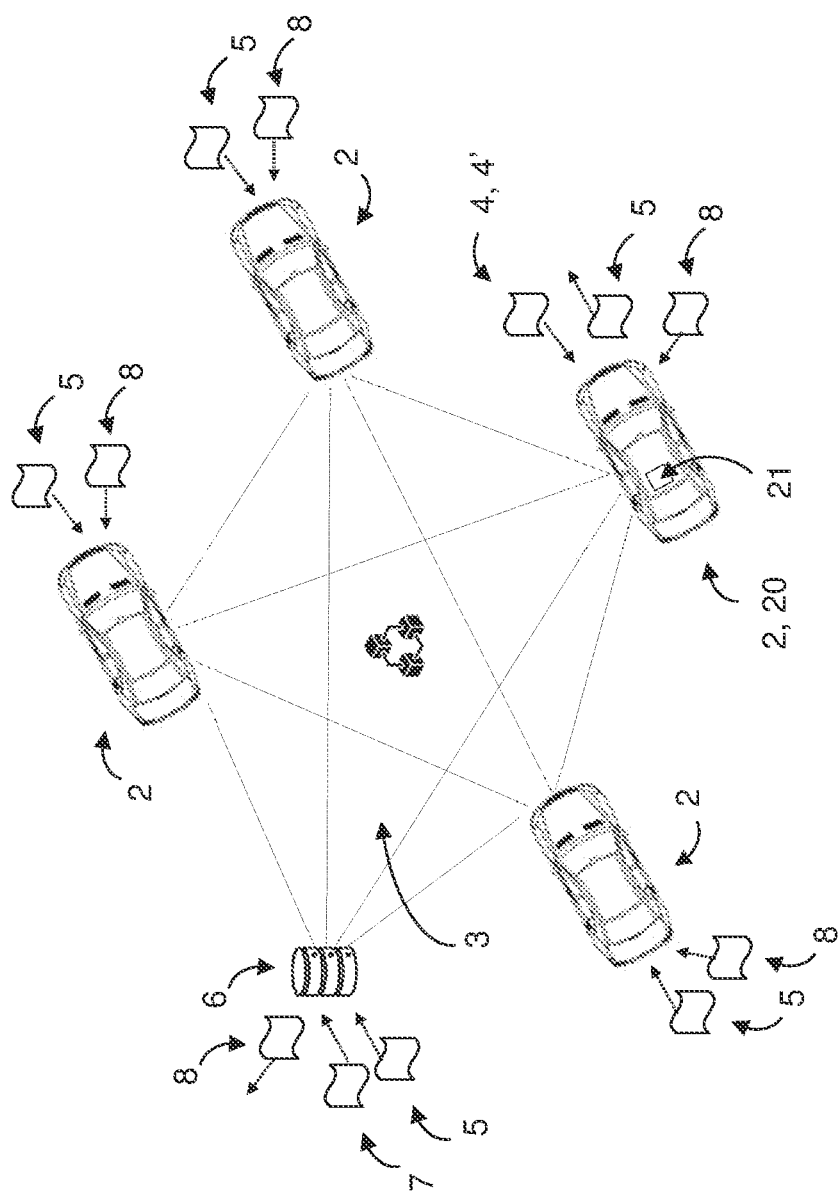
FIG. 1 illustrates a schematic view of an exemplifying distributed verification system according to embodiments of the disclosure.

Non-limiting embodiments of the present disclosure will now be described more fully hereinafter with reference to the accompanying drawings, in which currently preferred embodiments of the disclosure are shown. This disclosure may, however, be embodied in many different forms and should not be construed as limited to the embodiments set forth herein. Like reference characters refer to like elements throughout. Dashed lines of some boxes in the figures indicate that these units or actions are optional and not mandatory.

In the following, according to embodiments herein which relate to supporting verification of ADS features within specific ODDs, there will be disclosed an approach enabling an efficient verification process where complexity and/or transactions costs may be limited.

Figure 2:
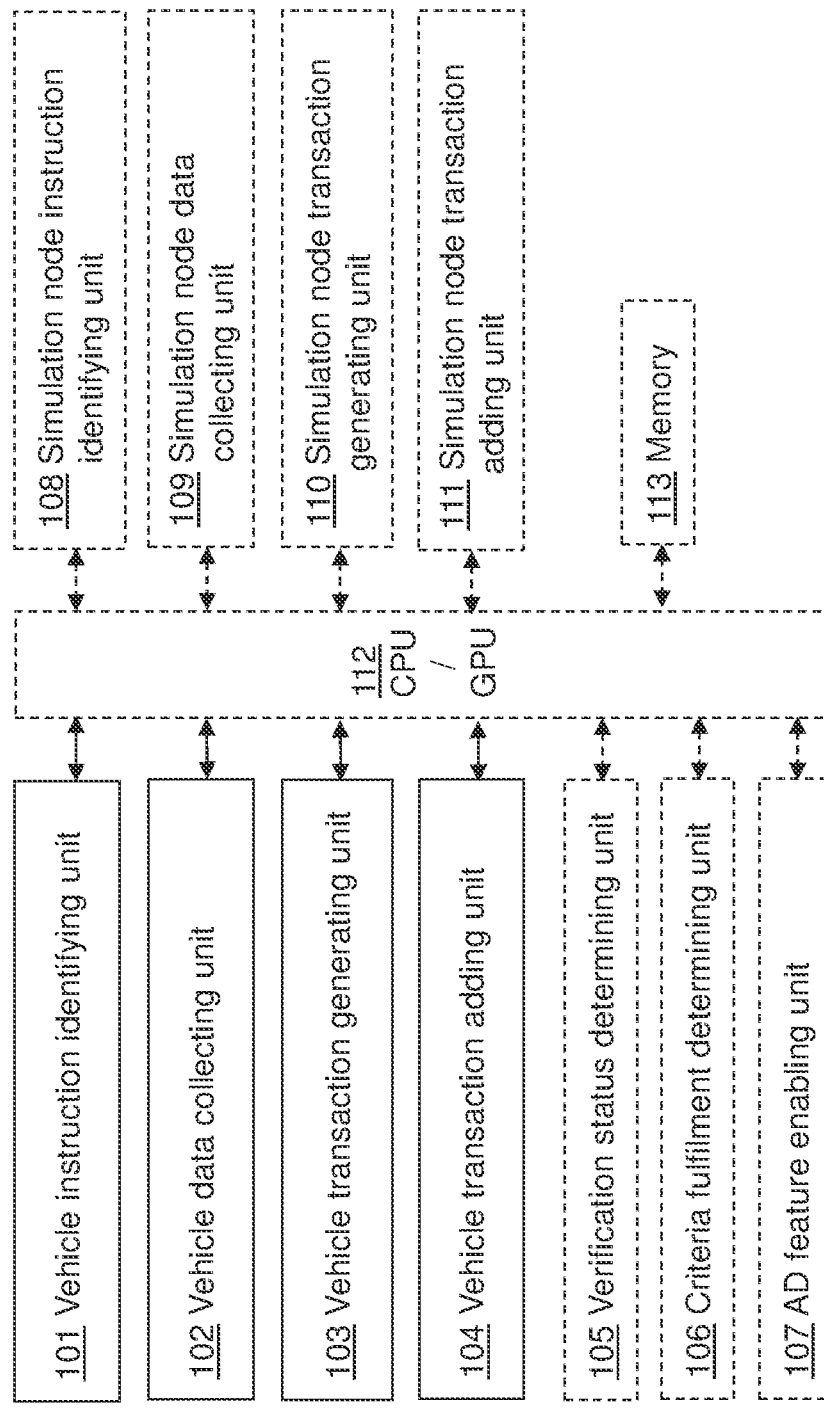
FIG. 2 is a schematic block diagram illustrating an exemplifying distributed verification system according to embodiments of the disclosure.

Referring now to the figures, there is depicted in FIG. 1 a schematic view—and in FIG. 2 a schematic block diagram—of an exemplifying distributed verification system 1 according to embodiments of the disclosure. The distributed verification system 1 is adapted for supporting verification of ADS features within specific ODDs. An ADS feature referred to herein may be represented by any arbitrary—e.g. known—ADS feature, such as any feature controlling a vehicle's movement. According to an example, such an ADS feature may thus be represented by e.g. lane control, cruise control, etc. An ODD referred to herein, on the other hand, may be represented by any arbitrary feasible operational conditions, as known in the art, under which an ADS feature is designed to and/or intended to function. According to an example, such an ODD may thus be related to e.g. type of road, vehicle speed, surroundings, weather conditions, etc. Moreover, the phrase "distributed verification system" may refer to "distributed validation system", "peer and/or node verification system", "ADS feature verification system", "ODD-specific verification system" and/or "assessment system", whereas "method performed by a distributed verification system" may refer to "at least partly computer-implemented method performed by a distributed verification system". "For supporting verification of ADS features", on the other hand, may refer to "for enabling verification of ADS features", "for verifying ADS features" and/or "for supporting verification of at least a first ADS feature", and according to an example further to "for supporting verification of unsupervised ADS features". Moreover, the phrase "within specific ODDs" may refer to "within predeterminable ODDs" and/or "within at least a first specific ODD", and according to an example further to "within expandable and/or expanded ODDs".

As illustrated in an exemplifying manner in exemplifying FIGS. 1 and 2, the distributed verification system 1 is—e.g. by means of a vehicle instruction identifying unit 101—adapted and/or configured for identifying at one or more ADS-equipped vehicles 2 connected via a peer-to-peer blockchain network 3, a respective at least first verification instruction 4 pertinent an at least first specified ODD of a specified ADS feature. Thereby, one or many vehicles 2—such as e.g. a vehicle fleet comprising numerous vehicles 2—which vehicles 2 respectively are provided with an ADS 21 and further are configured to communicate via said network 3, are made aware of verification requested for an indicated ADS feature in view of one or more indicated ODDs. That is, said vehicles 2 learn of respective verification instructions 4—for instance available in in-vehicle ADS-related software and/or obtained over the network 3—stipulating an ADS feature to be verified within specific ODD(s) and/or actions to be followed for contributing to said ADS feature being verified in said specific ODD(s).

Identifying—at the ADS-equipped vehicle(s) 2 connected via the network 3—respective verification instruction(s) 4, may be accomplished in any feasible manner, such as by said verification instruction(s) 4 being provided over the network 3 such as from a supervising and/or central node, peer, entity, server(s) and/or actor—in the following referred to under the common name central node—and/or said verification instruction(s) 4 being available to the vehicle(s) 2 via other means of storage, for instance integrated into in-vehicle software such as ADS-related software, and/or available via the blockchain. The peer-to-peer blockchain network 3—to which vehicles 2 and/or other nodes may be added and/or removed over time—may be represented by any arbitrary feasible peer-to-peer blockchain network, for instance known in the art, and comprise any arbitrary number of ADS-equipped vehicles 2 as well as other nodes. The respective at least first verification instruction 4, on the other hand, may be represented by any arbitrary request(s) and/or task(s) from which it may be derived a specific ADS feature, specific ODD(s) and actions to carry out at respective vehicle 2 in order to contribute to verification of said ADS feature within said ODD(s). According to an example, the verification instruction(s) 4 may indicate and/or comprise the task of monitoring the specified ADS feature and/or logging verification data and/or results thereof when said ADS feature is in an active state and/or is being active, i.e. every active period of the specified ADS feature. Furthermore, the respective verification instruction(s) 4 may differ from one vehicle 2 to another.

The phrase "identifying [ . . . ] a respective at least first verification instruction" may refer to "deriving, obtaining and/or determining [ . . . ] a respective at least first verification instruction". "A respective at least first verification instruction", on the other hand, may refer to "a respective common and/or various at least first verification instruction" and/or "a respective at least first vehicle verification instruction", whereas "verification instruction" may refer to "verification task, assignment and/or request", "validation and/or test instruction" and/or "verification intent and/or need". Moreover, "verification instruction pertinent an at least first specified ODD of a specified ADS feature" may refer to "verification instruction associated with, applicable for and/or valid for an at least first specified ODD of a specified ADS feature" and/or "verification instruction configured to be executed and/or acted upon within—and/or in view of and/or taking into consideration—an at least first specified ODD of a specified ADS feature", and according to an example further to "verification instruction configured to be executed and/or acted upon within—and/or in view of and/or taking into consideration—an at least first specified ODD while a specified ADS feature is active" and/or "verification instruction configured to be executed and/or acted upon within—and/or in view of and/or taking into consideration—an at least first specified ODD while a specified ADS feature is active under supervision". The phrase "specified ODD", on the other hand, may refer to "predeterminable ODD" and according to an example further to "unverified specified ODD", whereas "ODD of a specified ADS feature" may refer to "ODD of a predeterminable ADS feature" and/or "ODD of an at least first specified ADS feature".

Moreover, "one or more ADS-equipped vehicles connected via a peer-to-peer blockchain network" may refer to "one or more ADS-equipped vehicles configured to communicate via a peer-to-peer blockchain network", whereas "peer-to-peer blockchain network" may refer to "private and/or permissioned peer-to-peer blockchain network", "peer-to-peer distributed ledger technology, DLT, network" and/or merely "peer-to-peer network". "At one or more ADS-equipped vehicles", on the other hand, may refer to "at one or more ADS-equipped vehicle nodes". Respective vehicle(s) 2—which may range from merely a few up to thousands or even millions—may be represented by any arbitrary—e.g. known—manned or unmanned vehicle(s), for instance an engine-propelled or electrically-powered vehicle such as a car, truck, lorry, van, bus and/or tractor. Moreover, the term "vehicle" may refer to "autonomous and/or at least partly autonomous vehicle", "driverless and/or at least partly driverless vehicle", and/or "self-driving and/or at least partly self-driving vehicle", and according to an example further to "production vehicle" and/or "fleet vehicle". Moreover, respective vehicle 2 is provided with an ADS 21, which ADS 21 may be represented by any arbitrary ADAS or AD system e.g. known in the art and/or yet to be developed. Moreover, respective vehicle 2 and/or ADS 21 may comprise, be provided with and/or have onboard an optional perception system (not shown) and/or similar system and/or functionality adapted to estimate surroundings of the vehicle 2, and subsequently adapted to estimate world views of the surroundings e.g. with support from a—e.g. commonly known—digital map such as a high definition, HD, map, and/or an equivalent and/or successor thereof. Such an exemplifying perception system or similar system may refer to any commonly known system and/or functionality, e.g. comprised in one or more electronic control modules, ECUs, and/or nodes of respective vehicle 2 and/or ADS 21, adapted and/or configured to interpret sensory information—relevant for driving of the vehicle 2—to identify e.g. objects, obstacles, vehicle lanes, relevant signage, appropriate navigation paths etc. The exemplifying perception system or similar system—which may be adapted to support e.g. sensor fusion, tracking, localization etc.—may thus be adapted to rely on sensory information. Such exemplifying sensory information may for instance be derived from one or more—e.g. commonly known—sensors comprised in and/or provided onboard respective vehicle 2 adapted to sense and/or perceive the vehicle's 2 whereabouts and/or surroundings, for instance represented by one or a combination of one or more of surrounding detecting sensors, such as image capturing devices e.g. cameras, radar, lidar, ultrasonics etc., and/or a positioning system, odometer, inertial measurement units etc.

As illustrated in an exemplifying manner in exemplifying FIGS. 1 and 2, the distributed verification system 1 is further—e.g. by means of a vehicle data collecting unit 102—adapted and/or configured for collecting at at least a first vehicle 20 of the one or more vehicles 2, verification data from execution by the at least first vehicle 20 of the at least first ADS verification instruction 4 while the specified ADS feature is active within and/or in association with the at least first specified ODD. Thereby, there is gathered by at least a first vehicle 20, data resulting from said at least first vehicle 20 acting on the ADS verification instruction(s) 4 during the specified ADS feature being active within—and/or during circumstance and/or conditions relevant for—the specified ODDs. Accordingly, numerous and/or even an entire fleet of vehicles 20 may respectively collect—for instance during day-to-day travel—verification data upon conditions being met pertinent respective vehicle's 20 ADS verification instruction(s), for instance with the specified ADS-feature being active in a supervised mode and/or being active in a shadow mode.

Respective verification data may be collected by any arbitrary number of vehicles 20—out of the network-connected ADS-equipped vehicles 2—over any arbitrary feasible period of time such as ranging from hours or days up to years, and may further be collected in any arbitrary feasible—e.g. known—manner, such as being locally stored on respective vehicle 20. Furthermore, the verification data—which for instance may comprise events etc.—may be of any arbitrary feasible size and/or dimensions, for instance depending on the time duration the specified ADS feature is active, and may further for instance result from execution of the ADS verification instruction(s) 4 on data obtained with support from one or more onboard sensors such as surrounding detecting sensor(s) etc. described above. Moreover, the specific ADS feature being active may be represented by said ADS feature being active in any arbitrary feasible manner, such as being active under supervision of an operator such as a vehicle occupant e.g. driver—i.e. in supervised mode—and/or being active in a shadow mode where the software of the specific ADS feature is run in the background in the vehicle 2 and/or ADS 21, consuming data received from the vehicle platform. Collecting of verification data, on the other hand, may take place at any arbitrary feasible location and/or time when the specified ADS feature is active—either within the specified ODDs and/or during circumstances considered of value for verifying the specified ADS feature, such as e.g. every time the specified ADS feature is active.

The phrase "collecting [ . . . ] verification data" may refer to "gathering, retrieving, obtaining, deriving and/or storing [ . . . ] verification data", "collecting [ . . . ] verification data pertinent and/or associated with said specified ADS feature", "collecting [ . . . ] ADS feature-related verification data", "collecting [ . . . ] test data and/or verification result data" and/or merely "collecting [ . . . ] data". "At least a first vehicle", on the other hand, may refer to "respective vehicle". Furthermore, "from execution by said at least first vehicle of said at least first ADS verification instruction" may refer to "from said at least first vehicle acting on said at least first ADS verification instruction", and according to an example further to "from execution by said at least first vehicle of said at least first ADS verification instruction on data obtained with support from one or more on-board vehicle sensors". The phrase "while said specified ADS feature is active", on the other hand, may refer to "during a period of time at least partly coinciding with said specified ADS feature being active", and according to an example further to "while said specified ADS feature is active in a supervised mode and/or in a shadow mode". Moreover, "active within and/or in association with said at least first specified ODD" may refer to "active within—and/or during circumstances and/or conditions relevant for and/or resembling—said at least first specified ODD" and/or "active within said at least first specified ODD and/or active during circumstances and/or conditions relevant for verification of said specified ADS feature within said at least first specified ODD".

Figure 3:
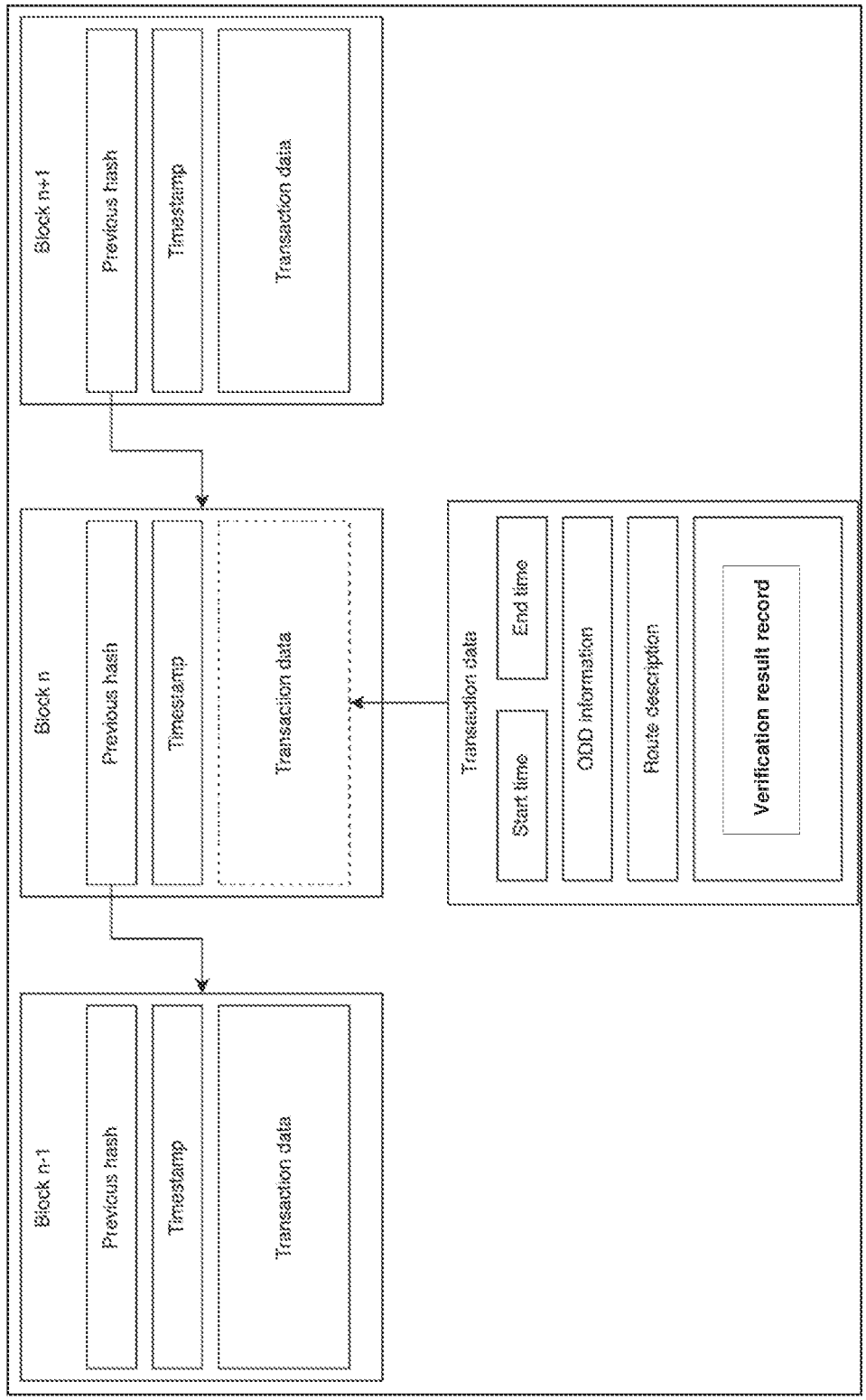
FIG. 3 illustrates a schematic view of an exemplifying distributed ledger block of a distributed verification system according to embodiments of the disclosure.

As illustrated in an exemplifying manner in exemplifying FIGS. 1 and 2, and further exemplified in FIG. 3 which illustrates a schematic view of an exemplifying distributed ledger block of a distributed verification system 1 according to embodiments of the disclosure, the distributed verification system 1 is further—e.g. by means of a vehicle transaction generating unit 103—adapted and/or configured for generating at the at least first vehicle 20, a verification result transaction 5 to be added to a distributed ledger of the network 3, which verification result transaction 5 comprises verification information derived from the verification data along with information of circumstances and/or configuration of said at least first vehicle 20 associated with said verification data. Thereby, the at least first vehicle 20 produces a blockchain transaction candidate 5 comprising a verification summary indicative of at least a subset of—and/or selected subset(s) of—said vehicle's 20 previously collected verification data along with data revealing circumstances and/or configuration of said vehicle 20 that applied in association with said verification data, such as temporal and/or geographical information—e.g. start time, end time, route description etc.—ODD information, vehicle configuration and/or identity, sensor information and/or software version, etc. Accordingly, numerous and/or even an entire fleet of vehicles 20 may respectively generate—for instance every time a respective active period of the specified ADS features is ended—respective verification result transactions 5 to be added to the distributed ledger, to thereby—since the network 3 is a peer-to-peer blockchain network—be accessible by all—or essentially all—network-connected vehicles 2.

Upon generating respective verification result transaction 5, a private key may—and most likely will—be used for signing of respective verification result transaction 5, as known in the art. Moreover, generating of a verification result transaction 5 may occur at any arbitrary feasible time instant following an ended collecting of verification data—e.g. following an ended active period of the specified ADS feature—such as essentially instantly thereafter, a predeterminable time thereafter and/or when circumstances—e.g. compute resources—so allow. The number of verification result transactions 5 that may be generated, on the other hand, either per vehicle 20 and/or altogether, may similarly be arbitrary and range from a few up to thousands, millions or even more. Furthermore, the verification information comprised in the verification result transaction 5 may comprise and/or refer to any arbitrary data derived and/or summarized from and/or based on the previously collected verification data, such as at least a portion, subset and/or summary thereof. In a similar manner, the in the verification result transaction 5 further comprised information of circumstances and/or configuration of the at least first vehicle 20 associated with the verification data, may similarly comprise any arbitrary feasible data indicating circumstances and/or configuration of said vehicle 20 that were valid during collection of the verification data, such as temporal and/or geographical information—e.g. start time, end time, route description etc.—ODD information, vehicle configuration and/or identity, sensor information and/or software version, etc. According to an example, for instance when the verification data comprises great amounts of data of interest too extensive to be added to the distributed ledger, such data—e.g. raw data—may be stored elsewhere—e.g. in a distributed file system—separate from the blockchain but available to all—or essentially all—vehicles 2 on the network 3, then the verification information may further comprise a link to such extensive data. That is, for cases where the data payload may be too large to add directly on the blockchain, it may be added to e.g. a distributed file system, and a reference and/or link to that data payload may be added in the result transaction on the blockchain. The vehicles 2 may for instance contribute with less data storage to such a common file system, while e.g. several non-vehicle nodes may support with more storage. Typically, this would be sensor data, which may be buffered and uploaded later, as the blockchain primarily may be for meta data only.

The phrase "generating [ . . . ] a verification result transaction" may refer to "creating and/or producing [ . . . ] a verification result transaction". Moreover, "verification result transaction" may refer to "verification result entry", "verification result data" and/or "a verification result record". "A distributed ledger" on the other hand, may refer to "a blockchain on said network", whereas "verification information" may refer to "verification summary". Furthermore, "said verification result transaction comprising [ . . . ] along with information of circumstances and/or configuration" may refer to "said verification result transaction comprising [ . . . ] and further comprising information of circumstances and/or configuration", whereas "information of circumstances and/or configuration" may refer to "data indicative of circumstances and/or configuration". The phrase "circumstances and/or configuration [ . . . ] associated with said verification data", on the other hand, may refer to "circumstances and/or configuration [ . . . ] pertinent said verification data" and/or "circumstances and/or configuration [ . . . ] valid during the collecting of said verification data."

As illustrated in an exemplifying manner in exemplifying FIGS. 1 and 2, the distributed verification system 1 is further—e.g. by means of a vehicle transaction adding unit 104—adapted and/or configured for, when consensus of the verification result transaction is reached on the network 3, adding the verification result transaction 5 to the distributed ledger. Thereby, upon consensus being reached among the vehicles 2 and potential further nodes on the network 3—for instance based on a proof-of-stake approach—the verification result transaction 5 is logged—for instance with support from one or more smart contracts—to the blockchain. Accordingly, numerous and/or even an entire fleet of vehicles 20 may respectively contribute to gathering verification data, with respective summaries thereof subsequently being added to the distributed ledger. The blockchain may thus be populated with potentially vast amounts of entries 5 relating to verification data pertinent the specified ODDs of the specified ADS feature, which—due to the network 3 being a peer-to-peer blockchain network—is available to all—or essentially all—vehicles 2 connected to the network 3, without involvement of a centralized verification machine and/or entity needed.

In other words, with the introduced concept, verification documentation and storage of proof may be decentralized, subsequently enabling an efficient verification process where complexity and/or transactions costs may be limited. This may further result in decreased investment and maintenance of the backend that would otherwise need to be centrally handled and would need to aggregate the vehicle fleet's verification results over time—such as over several years—and over many vehicles, such as thousands or even millions thereof. That is, the commonly known process to distribute verification tasks to a vehicle fleet, but let the vehicles send back all information to a centralized verification machine and/or entity for aggregation, reporting, storage and evaluation, is complicated and costly. Considering that such a process needs to continually run over potentially several years with an increasing fleet, the transaction cost to aggregate the information at a single destination from an increasing number of sources and manage potential updates in that data flow, is expected to drive cost higher. Furthermore, the data sets assign many requirements on the infrastructure and complicated GDPR data handling to manage traceability to the verification source, i.e. the vehicle fleet vehicles. With the introduced concept, however, by distributing not only the verification but also the verification reporting as a blockchain—thus limiting complexity and/or transactions costs of the verification process—additionally the GDPR data handling issue is managed as the vehicles may be tokenized through their individual signature and/or hash. The traceability and reliability of the verification result transaction(s) is also secured—i.e. reliable and long-term retention of information is fulfilled—in that the information, due to that entries to the blockchain can be considered permanent, is made permanent and non-changeable.

Consensus on the network 3 may be reached in any arbitrary feasible—e.g. known—manner, such as based on a—e.g. known—proof-of-stake approach for instance using—e.g. known—consensus algorithm(s) which all—or essentially all—vehicles 2 and potentially other nodes on the network 3 may have the ability to run. Furthermore, respective verification result transaction 5 may be added to the distributed ledger in any arbitrary feasible manner, for instance with support from one or more optional blockchain-stored smart contracts, which for instance may be configured for such adding. The optional blockchain-stored smart contract(s) described herein may follow general principles of smart contracts on blockchains as known in the art—which may involve programs and/or program code stored on the blockchain that for instance may run when predeterminable conditions are met, automate actions, and/or trigger next actions when conditions are met—however herein configured to control, trigger and/or assist in the verification of ADS features within specific ODDs. With the use of smart contract(s), data generated from said smart contract(s) may additionally—along with the verification result transaction—be added to the distributed ledger.

The phrase "when consensus [ . . . ] is reached" may refer to "upon and/or if consensus [ . . . ] is reached", whereas "consensus" may refer to "agreement", "approval" and/or "validation". "Reached on the network", on the other hand, may refer to "reached among the vehicles and/or further nodes on the network", whereas "adding the verification result transaction" may refer to "logging the verification result transaction". According to an example, "adding the verification result to the distributed ledger" may refer to "adding, with support from one or more blockchain-stored smart contracts, the verification result to the distributed ledger". Furthermore, "with support from one or more blockchain-stored smart contracts" may throughout the disclosure refer to "with support from common and/or various blockchain-stored smart contracts", "available in, included in, coded in and/or utilizing one or more blockchain-stored smart contracts" and/or "by being stipulated in—and/or controlled and/or triggered by—one or more blockchain-stored smart contracts", whereas "blockchain-stored smart contracts" may refer to "predeterminable blockchain-stored smart contracts", "smart contracts on a blockchain of said network", "smart contracts stored on a blockchain of said network" and/or "smart contracts on the blockchain", and according to an example further to "blockchain-stored chaincode".

Optionally, and as illustrated in an exemplifying manner in exemplifying FIG. 2, the distributed verification system 1 may further—e.g. by means of an optional verification status determining unit 105—be adapted and/or configured for determining a verification status of the specified ADS feature based on assessing data of aggregated verification result transactions 5 of the distributed ledger. Thereby, there may be established—from analysing and/or parsing accumulated entries 5 of the blockchain—the current verification status of the specified ADS feature within the specified ODD(s). The verification status may be determined in any arbitrary feasible manner, such as by aggregating verification result transactions 5—e.g. essentially all verification result transactions 5 or a predeterminable subset and/or portion thereof—and/or aggregating data thereof, to subsequently be assessed. For instance, should the verification result transactions 5 be stored in the blockchain as transactions, then the whole chain—or at least a predeterminable portion thereof—need to be looked at and aggregated to summarize the verification result. Additionally or alternatively, should a blockchain-stored smart contract be used, then the verification result transactions 5 stored in the smart contract may need to be aggregated to summarize the verification result, and/or said smart contract may be configured to as part of its execution automatically calculate the verification status by aggregating the verification result transactions 5. Since the network 3 is a peer-to-peer blockchain network all—or essentially all—network-connected vehicles 2 may inherently have access to the distributed ledger thereof, and subsequently the verification status may be determined by any arbitrary node(s) and/or vehicle(s) 2 on the network 3, for instance with support from one or more optional blockchain-stored smart contracts which for instance may be configured for such determining. Such smart contract(s) may—or may not—be part of and/or comprised in any of the previously discussed smart contract(s) and/or may be based on the same or similar smart contract principles.

The phrase "determining a verification status" may refer to "determining at a vehicle out of said one or more vehicles and/or at an other node connected to said network, a verification status", and according to an example further to "determining, with support from one or more blockchain-stored smart contracts, a verification status". Moreover, "verification status" may refer to "reached verification level". "Verification status of said specified ADS feature", on the other hand, may according to an example refer to "verification status of said specified ADS feature within said one or more specified ODDs". Furthermore, the phrase "based on assessing data" may refer to "by assessing data" and/or "based on assessing content", whereas "based on assessing data of aggregated verification result transactions" according to an example may refer to "based on assessing aggregated verification result transactions" and/or "based on assessing at least a portion and/or subset of verification result transactions". According to an example, "based on assessing data of aggregated verification result transactions" may refer to "based on assessing data of aggregated verification result transactions and/or simulation verification result transactions".

Further optionally, and as illustrated in an exemplifying manner in exemplifying FIG. 2, the distributed verification system 1 may further—e.g. by means of an optional criteria fulfilment determining unit 106—be adapted and/or configured for determining that the specified ADS feature is verified for the at least first specified ODD, when the verification status fulfil verification threshold criteria. Thereby, by comparing the verification status to predeterminable one or more thresholds and/or criterium stipulating conditions required to be reached and/or complied with for the specified ADS feature to be deemed verified within the specified ODD(s), it may be judged and/or established that the specified ADS feature is verified in the specified ODD(s) once said one or more thresholds and/or criterium are reached and/or complied with. Subsequently, an ODD within which the specified ADS feature is sufficiently verified, is thereby expanded to include the specified ODD(s). Consequently, a mode in which the ADS feature may be allowed within the specified ODD(s), may accordingly potentially be altered and/or upgraded, for instance from a supervised mode to an unsupervised mode. The verification threshold criteria may be represented by any arbitrary feasible one or more thresholds and/or criterium stipulating under what conditions the specified ADS feature is deemed sufficiently verified within the specified ODD(s). According to an example, the verification threshold criteria may relate to reaching a predeterminable number of kilometres within the specified ODD(s) without occurrence of predeterminable events, which events for instance may be represented by distance to other vehicles being below a predeterminable set distance. Furthermore, determining when or whether the verification status fulfil verification threshold criteria may be accomplished in any feasible manner, for instance by utilizing smart contract(s), which for instance may be configured for such determining. Such smart contract(s) may—or may not—be part of and/or comprised in any of the previously discussed smart contract(s) and/or may be based on the same or similar smart contract principles.

The phrase "determining that said specified ADS feature is verified" may refer to "judging that said specified ADS feature is verified" and/or "determining at a vehicle out of said one or more vehicles and/or at an other node connected to said network, that said specified ADS feature is verified", and according to an example further to "determining, with support from one or more blockchain-stored smart contracts, that said specified ADS feature is verified". Moreover, "is verified" may refer to "is deemed to be verified" and/or "is sufficiently verified". "When said verification status fulfil verification threshold criteria", on the other hand, may refer to "once, if and/or provided that said verification status fulfil verification threshold criteria", whereas "fulfil verification threshold criteria" may refer to "comply with verification threshold criteria". Moreover, "verification threshold criteria" may refer to "one or more verification thresholds and/or criterium" and/or "criteria stipulating under what conditions said specified ADS feature is deemed sufficiently verified within said one or more specified ODDs". According to an example, the phrase "when said verification status fulfil verification threshold criteria" may refer to "when said verification status fulfil verification threshold criteria stipulating a predeterminable distance and/or number of kilometres needed to be run within said at least first specified ODD without occurrence of predeterminable incidents".

Since the network 3 is a peer-to-peer blockchain network all—or essentially all—network-connected vehicles 2 may inherently have access to the distributed ledger thereof, and subsequently, the determining of when and/or whether the verification status fulfil the verification threshold criteria may take place at and/or be performed by any arbitrary node(s) and/or vehicle(s) 2 on the network 3. Accordingly, each vehicle 2 and/or other node on the network 3 may establish—and/or be informed e.g. via a central node on the network 3—when the verification status fulfil the verification threshold criteria which thus implies that the specified ADS feature is deemed sufficiently verified within the specified ODD(s), and subsequently potentially take action and/or adapt—and/or be instructed to do so e.g. via said central node—based thereon and/or as a consequence thereof, such as upgrading the mode allowed for the specified ADS feature within the specified ODD(s).

For instance, the ADS feature may optionally comprise an autonomous driving, AD, feature. The distributed verification system 1 may then, as illustrated in an exemplifying manner in exemplifying FIG. 2, further optionally—e.g. by means of an optional AD feature enabling unit 107—be adapted and/or configured for enabling the AD feature to be active within the specified at least first specified ODD. Thereby, by enabling the AD feature to be active within the specified ODD(s)—within which said AD feature now has been verified—the AD feature has been upgraded and/or altered from being allowed to be active under supervision to be allowed to be active unsupervised within the specified ODD(s). Enabling the AD feature to be active within the specified at least first specified ODD may be accomplished in any feasible manner, for instance by initiation from a central node and/or initiation at respective network-connected vehicle 2, for instance by utilizing smart contract(s) which for instance may be configured for such enablement. Such smart contract(s) may—or may not—be part of and/or comprised in any of the previously discussed smart contract(s) and/or may be based on the same or similar smart contract principles. Moreover, the phrase "enabling said AD feature to be active" may refer to "initiating and/or allowing said AD feature to be active" and/or "enabling at a vehicle out of said one or more vehicles, said AD feature to be active", and according to an example further to "enabling said AD feature to be active unsupervised and/or in an unsupervised mode". Furthermore, according to an example, "enabling said AD feature to be active" may refer to "enabling, with support from one or more blockchain-stored smart contracts, said AD feature to be active".

Further optionally, a respective subsequent at least first verification instruction 4' may be based on the verification status. Thereby, a previously determined verification status pertinent a specified ADS feature in view of a specified ODDs, may form the basis for subsequent respective verification instruction(s) 4' pertinent the specified ADS feature in view of updated, modified, expanded and/or other one or more ODDs. Accordingly, in taking a previous determined verification status into consideration, for instance should the previous verification status have been determined to fulfil the verification threshold criteria, subsequent verification instructions 4' may be designed and/or determined with the previous verification status providing input thereto. Consequently, an ODD within which the specified ADS feature is sufficiently verified, may thus be enabled to expand with updated, modified, expanded and/or other ODDs, one after the other, for instance with additional roads etc. Thus, should the approach disclosed herein be repeated—for instance continuously—based on and/or using as input repeatedly updated subsequent verification instructions 4', then an ODD within which the specified ADS feature is sufficiently verified may expand in an efficient manner, and even enabling for the process to be automated. For instance, one or more blockchain-stored smart contracts may be utilized, which smart contract(s) for instance may be configured to determine the subsequent verification instruction(s) 4' and/or change from—and/or redefine—the verification instructions 4 to the subsequent verification instruction(s) 4', based on assessing one or more previously determined pieces of verification status. Such smart contract(s) may—or may not—be part of and/or comprised in any of the previously discussed smart contract(s) and/or may be based on the same or similar smart contract principles. The respective subsequent verification instruction(s) 4' may be determined and/or have been determined at and/or by any arbitrary vehicle 2 and/or node on the network 3, such as for instance a central node, and subsequently provided to the vehicles 2 over the network 3. Additionally or alternatively, respective subsequent verification instruction(s) 4' may be determined and/or have been determined at respective vehicle 2. Moreover, the phrase "subsequent [ . . . ] instruction" may refer to "succeeding [ . . . ] instruction", whereas "based on said verification status" may refer to "derived from said verification status", and according to an example further to "based on said verification status and/or based on said verification status having been determined to fulfil the verification threshold criteria". Furthermore, according to an example "[ . . . ] wherein a subsequent respective at least first verification instruction is based on said verification status" may refer to "[ . . . ] further comprising: identifying—for instance with support from a subsequent instruction identifying unit of said distributed verification system—at one or more of said one or more vehicles, a respective subsequent at least first verification instruction pertinent an at least first other specified ODD of said specified ADS feature, wherein said respective subsequent at least first verification instruction is based on said verification status".

Further optionally, and as illustrated in an exemplifying manner in exemplifying FIGS. 1 and 2, the distributed verification system 1 may further—e.g. by means of an optional simulation node instruction identifying unit 108—be adapted and/or configured for identifying at a simulation node 6 connected to the network 3, at least a first simulation verification instruction 7 pertinent the at least first specified ODD of the specified ADS feature. The distributed verification system 1 may then further—e.g. by means of an optional simulation node data collecting unit 109—be adapted and/or configured for collecting at the simulation node 6, simulated verification data from running the at least first simulation verification instruction on prestored data. Moreover, the distributed verification system 1 may then further—e.g. by means of an optional simulation node transaction generating unit 110—be adapted and/or configured for generating at said simulation node 6, a simulation verification result transaction 8 to be added to the distributed ledger, which simulation verification result transaction 8 comprises simulation verification information derived from the simulated verification data. Furthermore, the distributed verification system 1 may then further—e.g. by means of an optional simulation node transaction adding unit 111—be adapted and/or configured for, when consensus of the simulation verification result transaction 8 is reached on the network 3, adding the simulation verification result transaction 8 to the distributed ledger. Thereby, similar to the introduced concept described in the foregoing in view of network-connected vehicles 2, one or more non-vehicle nodes 6 on the network may perform in a similar manner although based on simulation, potentially with support from optional smart contract(s) such as discussed above. Thus, simulation verification result transactions 8 may—as a complement to verification result transactions 5 originating from network-connected vehicles 2—in a similar manner be logged on the distributed ledger, and subsequently in a similar manner contribute to supporting verification of the specified ADS feature within the specified ODDs. Explanations and/or definitions of features and/or units etc. of the introduced concept described in the foregoing in view of the vehicles 2, equally apply to corresponding features and/or units etc. of the simulation node(s) 6, with the exception that they should be interpreted in consideration of—and/or transferred to—a simulation domain and/or environment. Thus, the simulation verification instructions(s) 7, the simulated verification data collected from running the simulation verification instruction(s) 7 on prestored data—which prestored data for instance may be data gathered from ADS-equipped vehicles and/or synthetic data—and/or the simulation verification result transaction(s) 8, may accordingly rather relate to predeterminable test vectors, scenarios and/or data sets relevant for the specified ADS feature and the specified ODD(s), to be run—and/or which have been run—on the simulation node 6. Moreover, the phrase "simulation node" may refer to "at least a first simulation node", "non-vehicle simulation node", "simulation peer" and/or "node adapted to run simulations", whereas "running [ . . . ] on prestored data" may refer to "executing [ . . . ] on prestored data".

As further shown in FIG. 2, the distributed verification system 1 comprises a vehicle instruction identifying unit 101, a vehicle data collecting unit 102, a vehicle transaction generating unit 103, a vehicle transaction adding unit 104, an optional verification status determining unit 105, an optional criteria fulfilment determining unit 106, an optional AD feature enabling unit 107, an optional simulation node instruction identifying unit 108, an optional simulation node data collecting unit 109, an optional simulation node transaction generating unit 110 and an optional simulation node transaction adding unit 111, all of which already have been described in greater detail above. Furthermore, the embodiments herein for supporting verification of ADS features within specific ODDs, may be implemented through one or more processors, such as processor 112, for instance represented by one or more Central Processing Units, CPUs, and/or one or more Graphics Processing Units, GPUs, together with computer program code for performing the functions and actions of the embodiments herein. Said program code may also be provided as one or more computer program products, for instance in the form of one or more data carriers carrying computer program code for performing the embodiments herein when being loaded into the distributed verification system 1. One such carrier may be in the form of a CD/DVD ROM disc and/or a hard drive, it is however feasible with other data carriers. The computer program code may furthermore be provided as pure program code on a server and downloaded to the distributed verification system 1. The distributed verification system 1 may further comprise one or more memories 113 comprising one or more memory units. The one or more memories 113 optionally includes high-speed random access memory, such as DRAM, SRAM, DDR RAM, or other random access solid-state memory devices, and further optionally include non-volatile memory, such as one or more magnetic disk storage devices, optical disk storage devices, flash memory devices, or other non-volatile solid-state storage devices. Moreover, the one or more memories 113 may be arranged to be used to store e.g. information, and further to store data, configurations, scheduling, and applications, to perform the methods herein when being executed in the distributed verification system 1. For instance, the computer program code may be implemented in the firmware, stored in one or more FLASH memories 113, of one or more embedded processors 112, and/or downloaded wirelessly e.g. from an off-board server. Furthermore, the units 101-111 described above, the optional processor(s) 112 and/or the optional one or more memories 113, may at least partly be comprised in one or more nodes e.g. ECUs of respective network-connected vehicle 2, e.g. in and/or in association with respective ADS 21, and or in one or more nodes on the network 3, such as a simulation node 6 and/or central node. Those skilled in the art will also appreciate that said units 101-111 described above as well as any other unit, interface, system, controller, module, device, element, feature, or the like described herein may refer to, comprise, include, and/or be implemented in or by a combination of analog and digital circuits, and/or one or more processors configured with software and/or firmware, e.g. stored in one or more memories such as the one or more memories 113, that when executed by the one or more processors such as the processor(s) 112 perform as described herein. One or more of these processors, as well as the other digital hardware, may be included in a single Application-Specific Integrated Circuitry, ASIC, or several processors and various digital hardware may be distributed among several separate components, whether individually packaged or assembled into a System-on-a-Chip, SoC.

Figure 4:
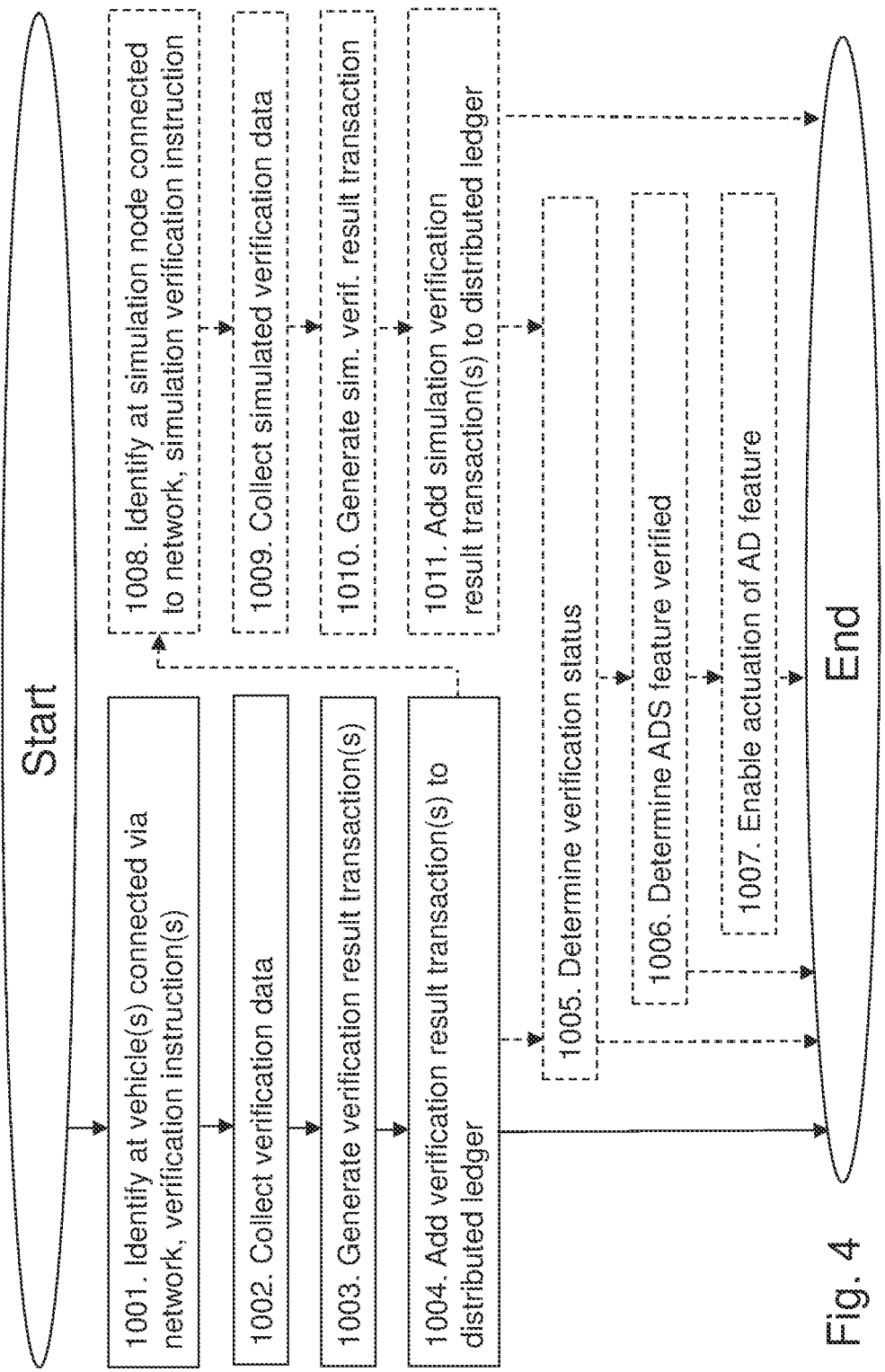
FIG. 4 is a flowchart depicting an exemplifying method performed by a distributed verification system according to embodiments of the disclosure.

FIG. 4 is a flowchart depicting an exemplifying method performed by a distributed verification system 1 according to embodiments of the disclosure. Said method is for supporting verification of ADS features within specific ODDs. The exemplifying method, which may be continuously repeated, comprises one or more of the following actions discussed with support from FIGS. 1-3. Moreover, the actions may be taken in any suitable order and/or one or more actions may be performed simultaneously and/or in alternate order where applicable. For instance, Actions 1001-1004 and Actions 1008-1011 may be performed essentially simultaneously and/or in alternate order.

Action 1001

In Action 1001, the distributed verification system 1 identifies—e.g. with support from the vehicle instruction identifying unit 101—at one or more ADS-equipped vehicles 2 connected via a peer-to-peer blockchain network 3, a respective at least first verification instruction 4 pertinent an at least first specified ODD of a specified ADS feature.

Action 1002

In Action 1002, the distributed verification system 1 collects—e.g. with support from the vehicle data collecting unit 102—at at least a first vehicle 20 of the one or more vehicles 2, verification data from execution by the at least first vehicle 20 of the at least first ADS verification instruction 4 while the specified ADS feature is active within and/or in association with the at least first specified ODD.

Action 1003

In Action 1003, the distributed verification system 1 generates—e.g. with support from the vehicle transaction generating unit 103—at the at least first vehicle 20, a verification result transaction 5 to be added to a distributed ledger of the network 3, which verification result transaction 5 comprises verification information derived from the verification data along with information of circumstances and/or configuration of the at least first vehicle 20 associated with the verification data.

Action 1004

In Action 1004, the distributed verification system 1 adds—e.g. with support from the vehicle transaction adding unit 104—when consensus of the verification result transaction is reached on the network 3, the verification result transaction 5 to the distributed ledger.

Action 1005

In optional Action 1005, the distributed verification system 1 may determine—e.g. with support from the optional verification status determining unit 105—a verification status of the specified ADS feature based on assessing data of aggregated verification result transactions 5—and/or simulation verification result transactions 8—of the distributed ledger.

Action 1006

In optional Action 1006—which may follow upon optional Action 1005 of determining a verification status—the distributed verification system 1 may determine—e.g. with support from the optional criteria fulfilment determining unit 106—that the specified ADS feature is verified for the at least first specified ODD, when the verification status fulfil verification threshold criteria.

Optionally, a respective subsequent at least first verification instruction 4' may be based on the verification status.

Action 1007

Optionally, the specified ADS feature may comprise an AD feature. Thus, in optional Action 1007—which may follow upon optional Action 1005 of determining a verification status and/or upon Action 1006 of determining that the verification status fulfil verification threshold criteria—the distributed verification system 1 may then enable—e.g. with support from the optional AD feature enabling unit 107—the AD feature to be active within the specified at least first specified ODD.

Action 1008

In optional Action 1008, the distributed verification system 1 may identify—e.g. with support from the optional simulation node instruction identifying unit 108—at a simulation node 6 connected to the network 3, at least a first simulation verification instruction 7 pertinent the at least first specified ODD of the specified ADS feature.

Action 1009

In optional Action 1009—which may follow upon Actin 1008 of identifying at least a first simulation verification instruction 7—the distributed verification system 1 may collect—e.g. with support from the optional simulation node data collecting unit 109—at the simulation node 6, simulated verification data from running the at least first simulation verification instruction 7 on prestored data.

Action 1010

In optional Action 1010—which may follow upon Actin 1009 of collecting simulated verification data—the distributed verification system 1 may generate—e.g. with support from the optional simulation node transaction generating unit 110—at the simulation node 6, a simulation verification result transaction 8 to be added to the distributed ledger, which simulation verification result transaction 8 comprises simulation verification information derived from the simulated verification data.

Action 1011

In optional Action 1011—which may follow upon Actin 1010 of generating a simulation verification result transaction 8—the distributed verification system 1 may—e.g. with support from the optional simulation node transaction adding unit 111—when consensus of the simulation verification result transaction 8 is reached on the network 3, add the simulation verification result transaction 8 to the distributed ledger.

The person skilled in the art realizes that the present disclosure by no means is limited to the preferred embodiments described above. On the contrary, many modifications and variations are possible within the scope of the appended claims. It should furthermore be noted that the drawings not necessarily are to scale and the dimensions of certain features may have been exaggerated for the sake of clarity. Emphasis is instead placed upon illustrating the principle of the embodiments herein. Additionally, in the claims, the word "comprising" does not exclude other elements or steps, and the indefinite article "a" or "an" does not exclude a plurality.

The invention claimed is:

1. A method performed by a distributed verification system for supporting verification of automated driving system, ADS, features within specific operational design domains, ODDs, the method comprising:
    identifying, at one or more ADS-equipped vehicles connected via a peer-to-peer blockchain network, a respective at least first verification instruction pertinent to an at least first specified ODD of a specified ADS feature, the at least first verification instruction being a test instruction, the at least first specified ODD being unverified;
    collecting, by at least a first vehicle of the one or more vehicles, verification data from execution by the at least first vehicle of the at least first verification instruction while the specified ADS feature is at least one of: active within, or in association with, the at least first specified ODD;
    generating, at the at least first vehicle, a verification result transaction to be added to a distributed ledger of the peer-to-peer blockchain network, the verification result transaction comprising verification information derived from the verification data along with at least one of information of circumstances and configuration of the at least first vehicle associated with the verification data; and
    when consensus of the verification result transaction is reached on the network, adding the verification result transaction to the distributed ledger.

2. The method according to claim 1, further comprising:
    determining a verification status of the specified ADS feature based on assessing data of aggregated verification result transactions of the distributed ledger.

3. The method according to claim 2, further comprising:
    determining that the specified ADS feature is verified for the at least first specified ODD, when the verification status fulfil verification threshold criteria.

4. The method according to claim 3, further comprising:
    identifying, at a simulation node connected to the network, at least a first simulation verification instruction pertinent to the at least first specified ODD of the specified ADS feature;
    collecting, at the simulation node, simulated verification data from running the at least first simulation verification instruction on prestored data;
    generating, at the simulation node, a simulation verification result transaction to be added to the distributed ledger, the simulation verification result transaction comprising simulation verification information derived from the simulated verification data; and
    when consensus of the simulation verification result transaction is reached on the network, adding the simulation verification result transaction to the distributed ledger.

5. The method according to claim 3, wherein the specified ADS feature comprises an autonomous driving, AD, feature, the method further comprising:
    enabling the AD feature to be active within the at least first specified ODD.

6. The method according to claim 3, wherein a respective subsequent at least first verification instruction is based on the verification status.

7. The method according to claim 2, wherein a respective subsequent at least first verification instruction is based on the verification status.

8. The method according to claim 2, further comprising:
    identifying, at a simulation node connected to the network, at least a first simulation verification instruction pertinent to the at least first specified ODD of the specified ADS feature;
    collecting, at the simulation node, simulated verification data from running the at least first simulation verification instruction on prestored data;
    generating, at the simulation node, a simulation verification result transaction to be added to the distributed ledger, the simulation verification result transaction comprising simulation verification information derived from the simulated verification data; and
    when consensus of the simulation verification result transaction is reached on the network, adding the simulation verification result transaction to the distributed ledger.

9. The method according to claim 1, further comprising:
    identifying, at a simulation node connected to the network, at least a first simulation verification instruction pertinent to the at least first specified ODD of the specified ADS feature;
    collecting, at the simulation node, simulated verification data from running the at least first simulation verification instruction on prestored data;
    generating, at the simulation node, a simulation verification result transaction to be added to the distributed ledger, the simulation verification result transaction comprising simulation verification information derived from the simulated verification data; and
    when consensus of the simulation verification result transaction is reached on the network, adding the simulation verification result transaction to the distributed ledger.

10. A distributed verification system configured to support verification of automated driving system, ADS, features within specific operational design domains, ODDs, the distributed verification system comprising a processor configured to:
    identify, at one or more ADS-equipped vehicles connected via a peer-to-peer blockchain network, a respective at least first verification instruction pertinent to an at least first specified ODD of a specified ADS feature, the at least first verification instruction being a test instruction, the at least first specified ODD being unverified;
    collect, by at least a first vehicle of the one or more vehicles, verification data from execution by the at least first vehicle of the at least first verification instruction while the specified ADS feature is active at least one of: within, or in association with, the at least first specified ODD;
    generate, at the at least first vehicle, a verification result transaction to be added to a distributed ledger of the network, the verification result transaction comprising verification information derived from the verification data along with at least one of information of circumstances and configuration of the at least first vehicle associated with the verification data; and
    when consensus of the verification result transaction is reached on the peer-to-peer blockchain network, add the verification result transaction to the distributed ledger.

11. The distributed verification system according to claim 10, wherein the processor is further configured to:
    determine a verification status of the specified ADS feature based on assessing data of aggregated verification result transactions of the distributed ledger.

12. The distributed verification system according to claim 11, wherein the processor is further configured to:
    determine that the specified ADS feature is verified for the at least first specified ODD, when the verification status fulfil verification threshold criteria.

13. The distributed verification system according to claim 12, wherein a respective subsequent at least first verification instruction is based on the verification status.

14. The distributed verification system according to claim 12, wherein the specified ADS feature comprises an autonomous driving, AD, feature, the processor being further configured to:
    enable the AD feature to be active within the at least first specified ODD.

15. The distributed verification system according to claim 11,
    wherein a respective subsequent at least first verification instruction is based on the verification status.

16. The distributed verification system according to claim 10, wherein the processor is further configured to:
    identify, at a simulation node connected to the network, at least a first simulation verification instruction pertinent to the at least first specified ODD of the specified ADS feature;
    collect, at the simulation node, simulated verification data from running the at least first simulation verification instruction on prestored data;
    generate, at the simulation node, a simulation verification result transaction to be added to the distributed ledger, the simulation verification result transaction comprising simulation verification information derived from the simulated verification data; and
    when consensus of the simulation verification result transaction is reached on the network, add the simulation verification result transaction to the distributed ledger.

17. The distributed verification system according to claim 10, wherein the distributed verification system is comprised in at least a first node, the at least first node being a network-connected ADS-equipped vehicle.

18. The distributed verification system according to claim 10, wherein the distributed verification system is comprised in at least a first node, the at least first node being a network-connected simulation node.

19. A non-transitory computer storage medium storing a computer program containing computer program code that when executed causes one of a computer or a processor to perform a method for supporting verification of automated driving system, ADS, features within specific operational design domains, ODDs, the method comprising:
    identifying, at one or more ADS-equipped vehicles connected via a peer-to-peer blockchain network, a respective at least first verification instruction pertinent to an at least first specified ODD of a specified ADS feature, the at least first verification instruction being a test instruction, the at least first specified ODD being unverified;
    collecting, by at least a first vehicle of the one or more vehicles, verification data from execution by the at least first vehicle of the at least first verification instruction while the specified ADS feature is at least one of: active within, or in association with, the at least first specified ODD;
    generating, at the at least first vehicle, a verification result transaction to be added to a distributed ledger of the network, the verification result transaction comprising verification information derived from the verification data along with at least one of information of circumstances and configuration of the at least first vehicle associated with the verification data; and
    when consensus of the verification result transaction is reached on the peer-to-peer blockchain network, adding the verification result transaction to the distributed ledger.

20. The non-transitory computer storage medium according to claim 19, wherein the method further comprises:
    determining a verification status of the specified ADS feature based on assessing data of aggregated verification result transactions of the distributed ledger;
    determining that the specified ADS feature is verified for the at least first specified ODD, when the verification status fulfil verification threshold criteria;
    identifying, at a simulation node connected to the network, at least a first simulation verification instruction pertinent to the at least first specified ODD of the specified ADS feature;
    collecting, at the simulation node, simulated verification data from running the at least first simulation verification instruction on prestored data;
    generating, at the simulation node, a simulation verification result transaction to be added to the distributed ledger, the simulation verification result transaction comprising simulation verification information derived from the simulated verification data; and
    when consensus of the simulation verification result transaction is reached on the network, adding the simulation verification result transaction to the distributed ledger.

* * * * *